United States Patent Office 3,127,375
Patented Mar. 31, 1964

3,127,375
METHOD FOR PREPARING POLYMER USING A COLUMBIUM COMPOUND AS A CATALYST
Max H. Keck, Cuyahoga Falls, Ohio, assignor to The Goodyear Tire & Rubber Company, Akron, Ohio, a corporation of Ohio
No Drawing. Filed Mar. 28, 1961, Ser. No. 98,738
8 Claims. (Cl. 260—75)

This invention relates to the preparation of glycol esters of polycarboxylic acids. More particularly this invention relates to an improvement in the method of preparing linear superpolyesters by the alcoholysis of esters of polycarboxylic acids with a glycol and the subsequent polymerization of these glycol esters to high polymeric linear polyesters.

In the preparation of linear superpolyesters, one of the most satisfactory methods from the standpoint of simplicity of reaction and economy of operation has been the ester interchange method in which the esters of the acids are reacted with a glycol to form the diglycol ester of the acid or a low molecular weight polymeric polyester which is then polymerized to a high molecular weight polymeric polyester by a condensation reaction with the splitting out of glycol. This process, however, has not been entirely satisfactory because the initial ester interchange reaction is slow and because many of the materials that catalyze this reaction are not effective as catalysts for the subsequent condensation reaction.

Heretofore, various materials have been proposed as catalysts for the ester interchange reaction between the esters of dicarboxylic acids and glycols and for the subsequent polymerization or condensation reaction. Metals in the form of powder, chips, ribbon or wire have been suggested, as have surface catalysts such as broken glass or silica gel. Among the more successful of the catalysts used in the past have been the alkaline earth metal alcoholates, the alkali metal carbonates, or other alkaline reacting salts, alkaline earth oxides, and litharge.

Many of these materials are effective catalysts for the initial simple ester interchange, and some of them catalyze the condensation reaction. However, many of the substances that catalyze the condensation reaction carry the polymerization only to a low degree or they do not promote the reaction effectively enough to give reaction rates acceptable for a commercial process.

According to the present invention it has been found that columbium compounds catalyze ester interchange reactions between glycols and esters of polycarboxylic acids or mixtures of esters of such acids, accelerate the condensation polymerization of the bis glycol esters and permit the formation in relatively short reaction times of polyesters of high molecular weight which may be readily processed to form products having excellent properties, including good color, i.e., freedom from discoloration.

For example, terephthalate or isophthalate esters or a mixture thereof can be reacted with a glycol and the resultant glycol ester condensed to form a polyester, both stages of the reaction being carried out in the presence of a columbium compound. The bis glycol ester may be prepared by any other suitable method such as by reacting the sodium or potassium salt of the acid with ethylene chlorohydrin or by reacting the acid with a large excess of the glycol or by ester interchange using a catalyst which is a catalyst for the ester interchange but which is not a catalyst for the polymerization reaction. The bis ester or low molecular weight polymer thereof can then be polymerized according to the usual known techniques using a columbium compound as the catalyst.

The following examples illustrate the invention and show how it may be carried out.

EXAMPLE 1

A glass reaction tube approximately 35 centimeters long having an inside diameter of 38 millimeters, having a side arm, and equipped with a nitrogen gas inlet tube and a stirrer, was charged with a mixture of 50 grams dimethyl terephthalate, 55 milliliters ethylene glycol, 0.015 gram zinc acetate, and 0.0010 gram of columbium oxalate. Nitrogen gas was slowly passed through the mixture and it was heated and stirred at 197° C. After 85 minutes at 197° C. the theoretical amount of methanol had distilled out of the reaction mixture. The temperature was then raised to 250° C. and after 35 minutes the pressure was reduced gradually at such a rate that the pressure dropped from 760 millimeters of mercury pressure to 0.05 millimeters of mercury pressure over a 15-minute period. At the end of the pressure reduction period the reaction temperature was raised to 280° and the pressure was maintained at 0.05 millimeter of mermury. After 60 minutes at 280° and 0.05 millimeter of mercury pressure the color of the mixture was very light yellow. A small sample of polymer removed from the mixture at this point was found to have an intrinsic viscosity of 0.635. The reaction was continued for another 15 minutes at 280° C. and 0.05 millimeter of mercury pressure. The polymer formed had an intrinsic viscosity of 0.728.

EXAMPLE 2

A mixture of 40 grams of bis beta hydroxyethyl terephthalate, 0.0010 gram of columbium oxalate, and 0.0090 gram of zinc acetate was charged into a glass reaction tube such as was used in Example 1 and was heated and stirred at 197° C. while nitrogen gas was slowly bubbled through it. After 30 minutes the temperature was raised to 250° C. After 15 minutes heating at this temperature the pressure was reduced gradually at such a rate that the pressure dropped from 760 millimeters to 0.05 millimeter of mercury pressure over a 15-minute period. At the end of the pressure reduction period the temperature was raised to 280° and the bubbling of nitrogen gas through the reaction mixture was discontinued. The reaction was stopped after 45 minutes at 280° C. and 0.5 millimeter of mercury pressure. The resulting polymer was light yellow in color and had an intrinsic viscosity of 0.792 when measured at 30.0° C. in a 40/60 s-tetrachloroethane/phenol mixture (40 parts by weight of s-tetrachloroethane and 60 parts by weight of phenol).

A masterbatch of low molecular weight polymer was prepared by the ester interchange reaction of a 60/40 mixture of dimethyl terephthalate and dimethyl isophthalate with ethylene glycol, using zinc acetate as an ester-interchange catalyst, according to the following example.

EXAMPLE 3

Six thousand eight hundred and fifty grams of a 60/40 dimethyl terephthalate-dimethyl isophthalate mixture, 4650 grams of ethylene glycol, and 2.0634 grams of zinc acetate were placed in a 12-liter flask. The mixture was heated for about 5 hours, the temperature being slowly raised from room temperature to a terminal temperature of 206° C. Methanol distilled out of the mixture first and then glycol distilled out. About 3100 grams of the product remaining in the flask was transferred to a stainless steel reaction pot of about 5 lb. capacity. Over a period of about 75 minutes the pressure in the reactor was reduced from atmospheric pressure to 25 millimeters of mercury pressure while the temperature was increased from 196° to 240° C. Efficient stirring was maintained during the course of the reaction period. At the end of the 75-minute period the polymer was extruded from the reactor to yield a clear, almost water-white, low molecular weight product which was glass-like at room temperature.

The low molecular weight product was used for testing the effectiveness of various columbium compounds as catalysts for the condensation polymerization reaction by which highly polymeric polyesters are prepared. In each case the condensation reaction was carried out as follows:

A glass reaction tube such as was used in Example 1 was charged with 50 grams of the low molecular weight product described above. The compound being tested for polymerization catalytic activity was added. The mixture was heated at 244° C. by means of a vapor bath around the reaction tube, the vapors being kept level with the top of the reaction mixture so that no appreciable amount of ethylene glycol distilled out. The mixture was stirred at approximately 200 r.p.m. while a slow stream of nitrogen was passed through the reaction mixture. After 15 minutes of heating at 244° C. the pressure was reduced gradually at such a rate that the pressure dropped from 760 millimeters of mercury pressure over a 15-minute period. At the beginning of the reduction of pressure the bath vapors were raised to the top of the reactor tube so that glycol would distill out of the reaction mixture. At the end of pressure reduction period the vapor bath was changed and replaced by another vapor bath having a boiling point of 273° C. Bubbling of nitrogen through the reaction mixture was discontinued. The reaction was stopped after one and one-half hours at 273° C. and 1 millimeter of mercury pressure. The color of the polymer was noted at this point and the intrinsic viscosity was measured at 30° C. in a mixture of 40 parts by weight of s-tetrachloroethane and 60 parts by weight of phenol.

Data obtained in these experiments are tabulated in Table I. In order to obtain a better comparison of the performance of these columbium compounds, a control run (Polymer No. 1) was made without a polycondensation catalyst. Also, for comparison, a run was made using polymeric ethylene glycol titanate as a polycondensation catalyst (Polymer No. 2).

Table I

PERFORMANCE OF CATALYSTS BASED ON COLUMBIUM

| Polymer No. | Catalyst | Grams of Polycondensation Catalyst per 50 grams of low Polymer | Melt Color | Intrinsic Viscosity |
|---|---|---|---|---|
| 1 | Zinc acetate but no polycondensation catalyst. | | Very pale yellow. | 0.653 |
| 2 | Ethylene glycol titanate. | 0.00123 | Medium yellow. | 0.809 |
| 3 | Columbium pentoxide. | 0.005 | Dark yellow | 0.880 |
| 4 | do | 0.0003 | Light yellow | 0.831 |
| 5 | do | 0.00006 | do | 0.708 |
| 6 | Columbium oxalate. | 0.0025 | Dark yellow | 0.898 |
| 7 | do | 0.0015 | Very light yellow. | 0.888 |
| 8 | do | 0.0005 | do | 0.760 |

The practice of the invention has been illustrated with particular respect to the 60/40 ethylene terephthalate-ethylene isophthalate copolyester and polymeric ethylene terephthalate. Polymeric ethylene isophthalate and copolymers containing various ratios of ethylene terephthalate to ethylene isophthalate can similarly be made using columbium compounds as catalysts. Also, polymeric esters of other dicarboxylic acids can be made. Representative examples of such acids are sebacic acid, adipic acid, azelaic acid, phthalic acid, and the naphthalic acids. Other glycols can be used such as the propylene glycols, hexamethylene glycol, diethylene glycol, 2,2-bis 4-(betahydroxyethoxy)phenyl propane. If desired, copolyesters can be formed by using mixtures of esters of the acids and one or more of the glycols or by using esters of one acid and a mixture of glycols. In addition to the dimethyl esters, other varieties such as the ethyl, propyl, butyl, and phenyl esters can be used. The preferred esters are the methyl esters of terephthalic acid and isophthalic acid.

The ester interchange reactions with which the catalyst can be used includes those in which the glycol in a glycol ester of a dicarboxylic acid is displaced by a higher boiling glycol, as illustrated by the reaction of bis (beta hydroxyethyl) terephthalate with 2,2-bis 4-(beta-hydroxyethoxy)phenyl propane to form, by ester interchange and condensation, copolyesters containing the repeating units (A) 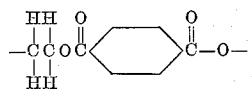

and (B) 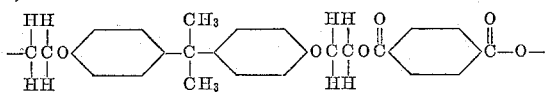

The preparation of such polymers is more fully described in copending application Serial No. 667,269, filed June 21, 1957.

In the practice of the invention various columbium compounds can be used. Representative examples of such compounds are columbium pentoxide, columbium oxalate, columbium pentachloride; and alkoxides of columbium such as columbium penta methoxide, columbium penta ethoxide, columbium penta propoxide, columbium penta butoxide, and columbium penta amyloxide. The amount of catalyst used may be varied over wide concentrations. As is usual with catalysts, the amount will be relatively small. As a general rule, the amount will be within the range of from 0.003 to 0.10% based on the dialkyl phthalate. The preferred range is from 0.002 to 0.08% based on the dialkyl phthalate to give a satisfactory reaction rate and a product of suitable viscosity and color.

The columbium compound can be used as the sole catalyst for the ester interchange and condensation reactions, or if desired, small amounts of another catalyst can be used to increase the rate of ester interchange and to assist in obtaining a polyester of higher viscosity in shorter reaction times. Thus, small amounts of a catalyst such as manganous acetate or zinc acetate can be used in conjunction with the catalyst of this invention.

The columbium compound can be added at the end of the initial ester interchange reaction but it is preferred to add it before this reaction has started or at least before it has progressed very far.

In the practice of the invention the preparation of the glycol ester and its subsequent polymerization is, in general, carried out in accordance with the usual known techniques. Thus, the reaction is preferably carried out in the absence of oxygen, generally in an atmosphere of an inert gas such as nitrogen or the like, in order to lessen darkening and to make it possible to obtain a high molecular weight pale or colorless product. Bubbling the inert gas through the reacting mixture serves the added functions of agitation and of expediting the removal of volatile components formed by the reaction. The polymerization or condensation reaction is carried out under reduced pressure, generally below 10 millimeters of mercury pressure and usually at or below 1 millimeter of mercury pressure at a temperature in the range of from 260 to 290° C., although other pressures and temperature can be used, according to known practice.

While certain representative embodiments and details have been shown for the purpose of illustrating the invention, it will be apparent to those skilled in this art that various changes and modifications may be made

I claim:

1. In a process for preparing a polyester by the self-condensation with the removal of glycol of a bis glycol ester of a dicarboxylic acid, the improvement which comprises carrying out said condensation in the presence of a catalytic amount of a columbium compound.

2. In a process for preparing a polyester by subjecting at least one bis ester of an acid selected from the group consisting of terephthalic acid and isophthalic acid to alcoholysis in the presence of an excess of ethylene glycol and thereafter subjecting the bis ethylene glycol ester thus formed to self-condensation with the removal of ethylene glycol, the improvement which comprises conducting both the alcoholysis and condensation in the presence of a catalytic amount of a columbium compound.

3. In a process for preparing a copolyester by the self-condensation with the removal of ethylene glycol of a mixture of bis ethylene glycol terephthalate and bis ethylene glycol isophthalate, the improvement which comprises conducting the condensation in the presence of a catalytic amount of a columbium compound.

4. A process according to claim 1 in which the columbium compound is selected from the group consisting of columbuim pentoxide, columbuim oxalate, columbium pentachloride, and columbium alkoxides in which the alkoxy groups contain from 1 to 5 carbon atoms.

5. The process according to claim 4 in which the columbium compound is columbium pentoxide.

6. In the ester interchange process of preparing a glycol ester of an organic dicarboxylic acid by reacting a bis ester selected from the group consisting of methyl, ethyl, propyl, butyl and phenyl esters of the acid with a glycol the improvement which comprises reacting the bis ester with the glycol in the presence of a catalytic amount of a columbuim compound.

7. The process of claim 6 in which the bis ester used is a bis ester of an aromatic dicarboxylic acid.

8. The process of claim 2 in which the columbium compound is in the amount of from 0.002 to 0.08 percent based on the bis ester used.

References Cited in the file of this patent

UNITED STATES PATENTS

| | | |
|---|---|---|
| 2,465,319 | Whinfield et al. | Mar. 22, 1949 |
| 2,769,619 | Sullivan | Jan. 3, 1956 |
| 2,820,778 | Spaenig et al. | Jan. 21, 1958 |